June 2, 1964  A. PAKVIS  3,135,494

VALVE STRUCTURE

Filed May 18, 1960

INVENTOR
Adrianus Pakvis

BY *Struck, Nolan & Neale*

ATTORNEYS 3,135,494
VALVE STRUCTURE
Adrianus Pakvis, Pittsburgh, Pa., assignor to Rockwell Manufacturing Company, Pittsburgh, Pa., a corporation of Pennsylvania
Filed May 18, 1960, Ser. No. 29,953
1 Claim. (Cl. 251—188)

This invention relates to plug valve structure and in particular it relates to the fluid tight sealing of a plug valve body bore wherein a ported plug is rotatably mounted.

In its preferred embodiment the invention will be described as utilized to provide an end cover seal for the plug bore in a plug valve assembly of the type disclosed in Nordstrom Patent No. 2,398,444 or Scherer 2,584,161. In such valves the plug is tapered, and the end cover at the larger end of tapered bore wherein the plug rotates, exerts a seating pressure on the plug in the bore. Various types of annular plastic seals, gaskets and the like have been proposed for making this end cover tight against leakage of the high line pressure of the valved fluid, and the present invention contemplates a novel structurally simple solution of the problem.

Accordingly it is a major object of the invention to provide in a plug valve assembly of the type wherein a ported plug is rotatable in a valve body bore, an end closure for the bore which has tight essentially conical sealing surface engagement with the bore wall when the closure is mounted on the body over the end of the bore, this sealing surface engagement including a surface on a continuous flexible lip on the closure which smoothly engages a similar surface within the bore.

A further object of the invention is to provide a novel valve plug bore closure having on its inner end an axially projecting integral annular flexible lip that has an external conical surface adapted to engage a coacting conical surface within the bore.

Further objects will appear as the description proceeds in connection with the appended claims and the annexed drawings wherein:

Figure 1:
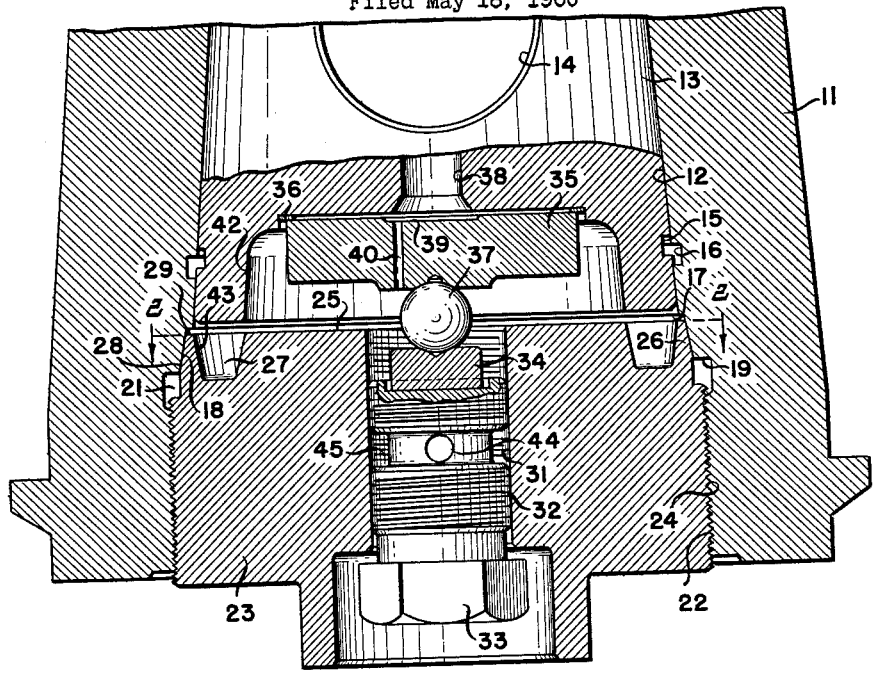
FIGURE 1 is a fragmentary view partially in section showing a valve body having a tapered plug valve bore receiving an end closure in accord with a preferred embodiment of the invention.
Figure 2:
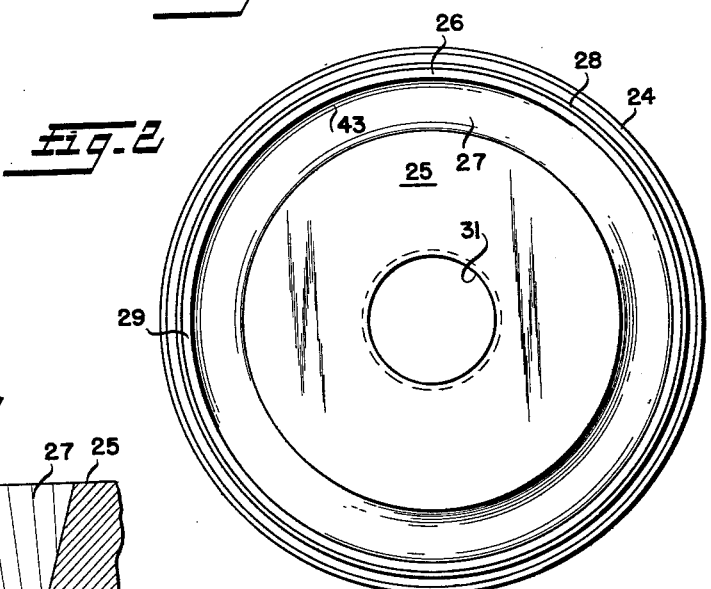
FIGURE 2 is an end view of the end closure, essentially looking in the direction of line 2—2 of FIGURE 1.
Figure 3:
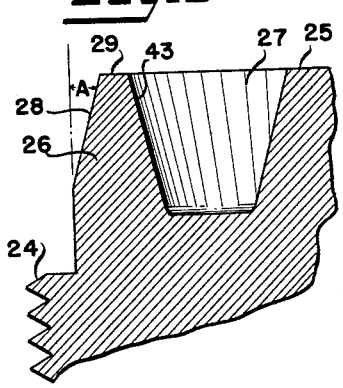
FIGURE 3 is an enlarged fragmentary view showing the sealing surface structure.

The valve body 11 is formed with a conical bore 12 wherein a conical plug 13 is seated to rotate about the bore axis. This bore is usually tapered at about four and one-half degrees with respect to the plug axis. Plug 13 is formed with a through port 14 extending at right angles to the bore axis, and is rotatable through 90° about that axis to align port 14 with line fluid passages (not shown) in the body so that the valve will be open, or to block such passages in valve closed position.

The walls of bore 12 and plug 13 are formed with coacting lubricant or like sealing plastic distribution grooves such as those at 15 and 16 in the usual manner shown in more detail in said Nordstrom and Scherer patents. At the other end of the plug 13 an operating stem is provided, as in said patents.

The plug seating section of bore 13 terminates at the larger diameter end at a shoulder 17 that is annular and perpendicular to the axis of bore 12. Axially outward of shoulder 17, the bore is formed with a larger diameter essentially conical closure lip seating surface 18 which terminates axially in another shoulder 19 where the bore is appreciably enlarged to provide an annular space 21.

Beyond space 21 the bore is formed with a threaded section 22 that extends to the adjacent open end of the bore. This may be a buttress thread as in the Nordstrom patent.

A plug-like cover 23 serves as the end closure for bore 12, and it has a threaded periphery 24 coacting with bore threads 22 whereby rotation of the cover draws it axially into the bore.

At its inner end cover 23 has a flat face 25 perpendicular to the bore axis and near the inner periphery of the cover is provided an integral annular flexible sealing lip 26 formed by cutting a suitable annular groove 27 into the cover at face 25. Groove 27 is circular and concentric with the bore axis.

The outer surface 28 of lip 26 is an essentially conical seating surface adapted to coact with bore surface 18.

Thus, with surfaces 18 and 28 being substantially of the same diameter and similarly inclined it will be seen that as cover 23 is rotated in its threaded bore mount surfaces 18 and 28 will relatively move axially into tight contact over a wide annular region. The parts are so dimensioned that the tip 29 of lip 26 is axially spaced from shoulder 17 when the cover is tight, and the space 21 is large enough so that there is no abutment of the cover with the bore there.

In actual practice each of surfaces 18 and 28 is uniformly tapered and inclined with respect to the bore axis at about the same angle, usually about 10°. However, in order to provide the establishment of an optimum seal it has been found desirable to accurately machine the surfaces 18 and 28 in predetermined relation so that the angle of taper of surface 18 on the body with respect to the bore axis is slightly greater than the angle of taper of cover surface 28. This difference in angle of taper can be from zero to about one-half a degree.

Thus as the lip 26 advances into the bore along surface 28 there is smooth tight wedging engagement between the surfaces 18 and 28 at the inner tip of the lip 26 all the way to the final position of the cover. The lip 26, being flexible, yields and peripherally contracts sufficiently at the cover advances into the bore to produce this result.

As a consequence of this arrangement there is provided at least entirely around the tip of the lip 26 an initial band of sealing engagement with surface 18 and there is no effective radial clearance between surfaces 18 and 28 at the inner edge of lip 26. In practice the surfaces 18 and 28 are actually effectively in smooth contact over substantially all their coextensive areas.

Cover 23 is formed with a central threaded bore 31 that rotatably receives a plug adjusting screw 32 having a wrench-fitting external head 33. At its inner end screw 32 is recessed slightly to receive a ball seat block 34. The large end of plug 13 is recessed to receive a pressure transmitting disc 35 the periphery of which seats on an annular washer 36. A hard steel spherical ball 37 is interposed between similar socket surfaces on block 34 and disc 35 on the bore axis, and the arrangement is such that when screw 32 is tightened force due to its axial advance toward the plug is transmitted through block 34, ball 37 and disc 35 to seat the plug 13 in the tapered section of bore 12. This plug seating pressure can be thereby accurately controlled and maintained.

Plug 13 is formed with a passage 38 leading from port 14 to a space 39 between the plug and disc 35 and a further passage 40 connects space 39 to the space 42 between the plug 13 and cover 23. In this way the line fluid pressure acts on the inner periphery of lip 26 within the groove 27 and along the surface indicated at 43, tending to expand the flexible lip toward the surrounding bore surface at 18 and thereby enhancing the seal at higher line pressures.

Usually plug adjusting screw 32 is hollow and closed at the end near block 34, and is formed with a plurality of radial passages 44 through which plastic lubricant may be dispensed under pressure into the annular sealing space 45 by a fixture (not shown) in head 33, as in the Nordstrom patent.

The invention therefore provides an effective tight permanent metal-to-metal high pressure seal between the end cover of the plug body bore and the body. This seal increases with line pressure. The plug seating force reacts against the cover, but this is taken by the threaded zone at 22, 24 and does not separate surfaces 18 and 28. Even if this produced some tendency to separate surfaces 18 and 28, the expanding action of the line fluid pressure on lip 26 more than compensates. Special renewable annular seals such as used between the cover and body in the Nordstrom patent are no longer needed.

The plug, body and cover are all formed preferably of steel, and the tight wedging surface contact alone of the lip 26 within the body bore has proved to be satisfactory in maintaining a seal against outward leakage of line fluid pressures for which the body is designed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

In a plug valve assembly, a metal valve body having a through passage intersected by a plug mounting bore that is open at least at one end, a ported plug rotatably mounted in said bore for displacement between passage open and closed positions, a metal plug-like cover for said open end of said bore, means threadedly securing said cover in said bore, a pressure transmitting disc, means including a screw threaded in said cover for urging said disc into seating engagement against the end of said plug facing said open end of said bore for transmitting through said disc an axial force for seating said plug in said bore, said plug and said cover being arranged to define a chamber disposed at said open end of said bore and receiving said pressure transmitting disc, means providing communicating fluid passages in said plug and said disc for establishing fluid communication between said valve body through passage and said chamber at least when said plug is in passage open position, means providing an annular sealing surface in said bore located axially outwardly of said plug and circumferentially surrounding the inner end of said cover, and an axially extending integral laterally flexible annular lip on the inner end of said cover, said lip having an external peripheral sealing surface in smooth tight wedging metal-to-metal direct engagement with said sealing surface in said bore, said sealing surfaces being similarly inclined with the interface between said sealing surfaces lying axially inwardly of said means securing said cover and substantially in a conical envelope diverging with respect to the tip of said lip, the angle of inclination of said body sealing surface with respect to the bore axis being sufficiently greater than the corresponding angle of inclination of said lip sealing surface to insure at least an initial band of sealing engagement upon assembly, the inner periphery of said lip being in fluid communication with said chamber so that increased fluid pressure acting on said plug in said chamber tends to outwardly expand said lip and augment sealing engagement at said interface.

References Cited in the file of this patent

UNITED STATES PATENTS

| | | |
|---|---|---|
| 798,507 | Hally | Aug. 29, 1905 |
| 2,398,444 | Nordstrom | Apr. 16, 1946 |
| 2,746,486 | Gratzmuller | May 22, 1956 |
| 3,021,974 | Watts | Feb. 20, 1962 |

FOREIGN PATENTS

| | | |
|---|---|---|
| 759,178 | Great Britain | Oct. 17, 1956 |